United States Patent
Sharp et al.

(10) Patent No.: US 10,943,261 B2
(45) Date of Patent: Mar. 9, 2021

(54) SYSTEM AND METHOD FOR IMPROVED SERVER PERFORMANCE BASED ON A USER'S MESSAGING BEHAVIOR

(71) Applicant: VERIZON MEDIA INC., New York, NY (US)

(72) Inventors: Doug Sharp, San Francisco, CA (US); Varun Bhagwan, San Jose, CA (US)

(73) Assignee: VERIZON MEDIA INC., New York, NY (US)

( * ) Notice: Subject to any disclaimer, the term of this patent is extended or adjusted under 35 U.S.C. 154(b) by 935 days.

(21) Appl. No.: 14/575,683

(22) Filed: Dec. 18, 2014

(65) Prior Publication Data

US 2016/0180380 A1 Jun. 23, 2016

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0264* (2013.01)

(58) Field of Classification Search
CPC ....................................... G06Q 30/0207–0277
See application file for complete search history.

(56) References Cited

U.S. PATENT DOCUMENTS

| | | | | |
|---|---|---|---|---|
| 8,788,320 B1 * | 7/2014 | Snyder | ............... | G06Q 30/0241 705/14.54 |
| 2006/0253453 A1 * | 11/2006 | Chmaytelli | ......... | G06F 16/9535 |
| 2009/0259540 A1 * | 10/2009 | Phan | ...................... | G06Q 30/02 705/14.4 |
| 2012/0047014 A1 * | 2/2012 | Smadja | .................. | G06Q 30/02 705/14.53 |
| 2014/0195345 A1 * | 7/2014 | Lyren | ................. | G06Q 30/0271 705/14.53 |
| 2014/0214537 A1 * | 7/2014 | Yoo | ..................... | G06Q 30/0255 705/14.53 |
| 2014/0229278 A1 * | 8/2014 | Cohen | ................ | G06Q 30/0267 705/14.53 |

* cited by examiner

*Primary Examiner* — Kambiz Abdi
*Assistant Examiner* — Christopher Stroud
(74) *Attorney, Agent, or Firm* — James J. DeCarlo; Greenberg Traurig, LLP

(57) ABSTRACT

Disclosed are computer systems and methods for contextually targeted advertising using a regular periodicity of information derived from a user's messaging behavior. The disclosed systems and methods enable the prediction of future purchases based on a periodicity analysis of a user's purchase history, whereby advertisements can be targeted to the user based on the user's determined purchase habits. The disclosed systems and methods analyze a user's inbox by mining for purchase receipt messages, and determine a frequency of purchases associated with such receipts. Based on the determined frequency, the disclosed systems and methods can predict when subsequent like or similar purchases are to occur, whereby relevant advertisements or coupons may be served to the user in advance of the projected purchases.

14 Claims, 5 Drawing Sheets

SYSTEM AND METHOD FOR IMPROVED SERVER PERFORMANCE BASED ON A USER'S MESSAGING BEHAVIOR

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

RELATED ART

Marketing of products and services online through advertisements is ubiquitous across all Internet platforms. Internet advertising has proven to be effective for messaging, and also a lucrative source of revenue. Advertising on the Internet provides the possibility of allowing advertisers to cost-effectively reach highly specific target audiences—as opposed to traditional broadcast and print advertising media that reach only broadly definable target audiences (e.g. television viewers in the greater New York area).

SUMMARY

The present disclosure describes computer systems and methods for improving the function of ad servers programmed to provide contextually targeted advertising using a regular periodicity of information derived from a user's messaging behavior. Thus, improved coupling and cooperation between a mail or message server and an ad server yields greater efficiencies in computing and determining time sensitive and highly relevant contextual advertisements. According to embodiments the present disclosure, the disclosed systems and methods enable the prediction of likely or expected future purchases based on a periodicity analysis of a user's purchase history, whereby advertisements can be better targeted to the user based on the user's determined purchase habits.

The disclosed systems and methods analyze a user's messaging inbox (e.g., email or other messaging platform) by mining for purchase receipt messages, and determine a frequency of purchases associated with such receipt messages. Based on the determined frequency of those receipts, the disclosed systems and methods can predict or forecast the timing of subsequent like or similar purchases are likely to occur, so as to serve relevant advertisements or coupons to the user in advance or closely proximate a time period during which the projected purchases are likely to occur. The disclosed systems and methods can lead to higher click-through-rates (CTRs) and increased revenues for served advertisements as they are not only more contextually relevant to the user's desires, they are more temporally relevant to the user's needs.

In accordance with one or more embodiments, a method is disclosed which includes analyzing, via a computing device, an inbox associated with a user to identify purchase receipt messages associated with a purchased item, the identification comprising parsing each message in the inbox to identify messages comprising information associated with the purchased item; determining, via the computing device, a frequency associated with the purchase receipt messages, the frequency determination comprising determining a purchase pattern of the user associated with the purchased item, the purchase pattern comprising a count of each purchase receipt message and an interval between each purchase receipt message; determining, via the computing device, a future purchase event timing associated with the purchased item based on the purchase pattern, the future purchase event timing representing a forecast of a time period during which the user will purchase the item in the future; collecting, via the computing device, potential purchase information associated with the purchased item, the potential purchase information representing the future purchase event timing and the item; communicating with an ad platform, via the computing device over a network, to obtain an advertisement satisfying criteria based on the potential purchase information; and causing communication, via the computing device over the network, of the advertisement to the user at a time proximate the future purchase event timing.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for monetizing periodicity of a user's purchase history.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
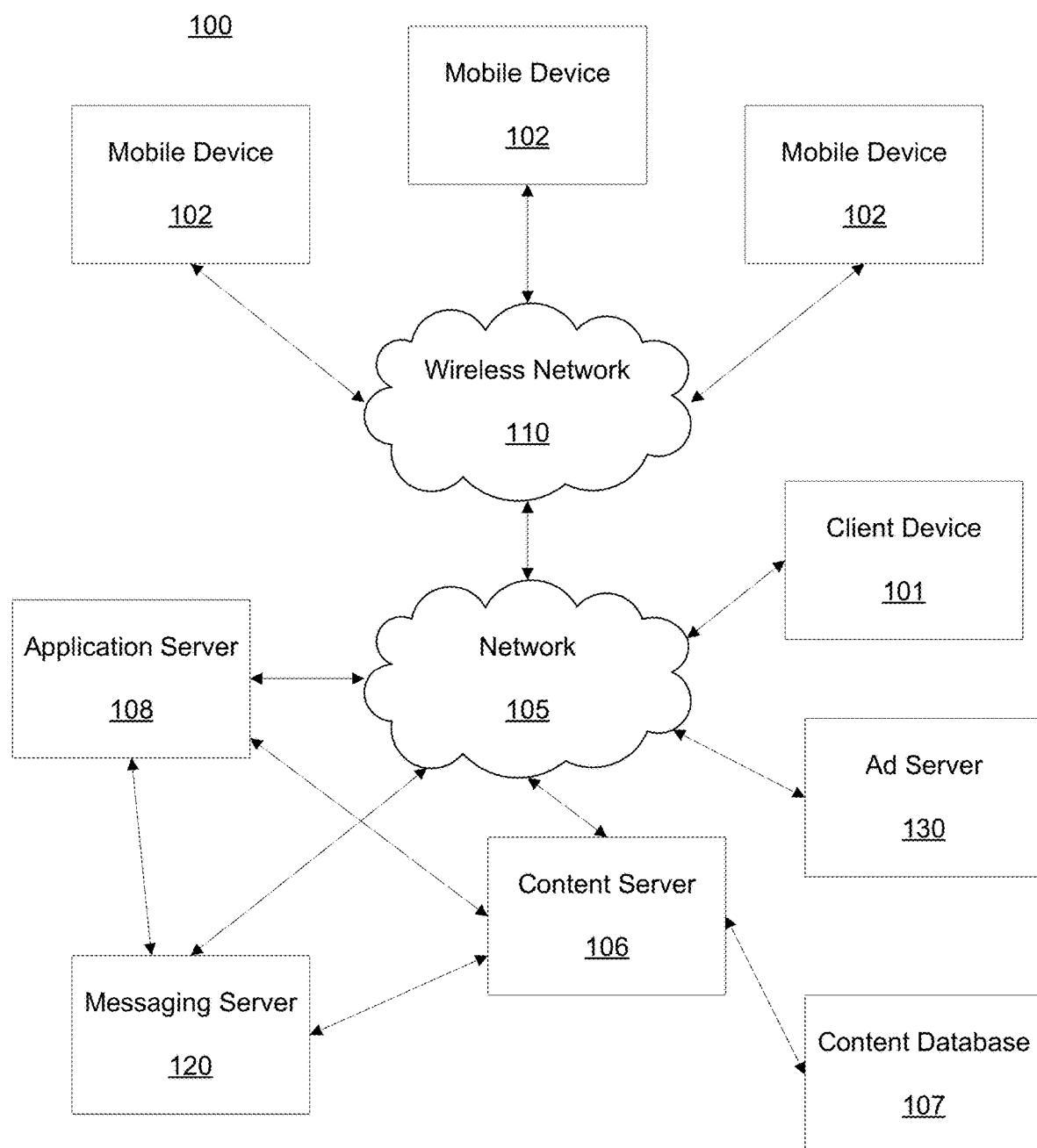
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, conventional advertising systems may display contextually relevant advertisements based on recently received messages but cannot couple with a mail server or messaging platform to serve contextually and temporally relevant advertisements to users. As discussed herein, the present disclosure provides systems and methods for anticipating when contextually relevant advertisements will be relevant to a user, and serving such advertisements to the user at the opportune time. Utilizing contextual prediction modelling, the disclosed systems and methods can effectuate higher click-through-rates (CTRs) and increased revenues, salience and relevance of served advertisements.

Websites and messaging applications that host advertisements are typically paid on a cost per impression basis (CPM), a cost per click (CPC), or cost per action accomplished (CPA), or under some other agreed upon billable event. Through implementation of the disclosed systems and methods, the hosting sites and applications, and advertisers can benefit from improved sales due to increased billable events being realized as the disclosed prediction modelling ensures that advertisements being served to users are not only contextually relevant to the user's desires, but they are also temporally relevant to the user's needs.

According to some embodiments, the disclosed systems and methods utilize a regular periodicity of information derived from a user's messaging behavior. That is, the disclosed systems and methods enable the prediction of future purchases based on a periodicity analysis of a user's purchase history, whereby advertisements can be targeted to the user based on a user's determined purchase habits. The disclosed systems and methods analyze a user's inbox by mining for purchase receipt messages (or order confirmation messages), and determine a frequency pattern of purchases associated with such receipts. Based on the determined frequency pattern of such receipts, the disclosed systems and methods can predict when subsequent like or similar purchases are to occur, thereby leading to contextually and temporally relevant advertisements, coupons or promotions being served to the user in advance of the projected purchases.

By way of a non-limiting example, user Bob's email inbox is mined to identify his past purchases. As discussed in more detail below, mining is according to a threshold or time period, and in some embodiments of the present disclosure, such threshold/time period can be varied or comprise multiple time spans (e.g., years, seasons, weeks, and the like). For example, Bob's inbox is analyzed for a future purchase event and it is determined that Bob purchases a new car every three years during the spring season. Bob last purchased a car 2 years ago; therefore, it can be anticipated/predicted that Bob will be purchasing a new car next spring. As such, in advance of spring of 2015, Bob can be served advertisements for cars.

Further to this example, if Bob is determined to always (or most recently or most often) purchase a Ford®, then the advertisements may be related to a Ford®. Indeed, some embodiments exist where the advertisements may not be related to a Ford® at all, as this information may be sold to other third party advertisers that may only serve Bob ads for a Chevrolet®, thereby attempting to sway Bob's car preference in the direction of the third party's client—Chevrolet® in this example.

By way of another non-limiting example, analysis of Jane's message receipts in her inbox reveal that she purchases school supplies for her daughter every August. As such, according to the disclosed systems and methods discussed herein, in advance of or near August next year, Jane can be served advertisements for school supplies.

As discussed above and in more detail below, the disclosed systems and methods can determine a category (or content type or predetermined range of items a purchased item falls within or is associated with) associated with a user's purchase history, and a frequency of such purchase history. The disclosed systems and methods can utilize this information to serve the user advertisements that correspond to the user's habitual purchase window associated with such category. According to some embodiments, the ads may be served in advance of the anticipated purchase date according to a threshold period. This threshold accounts for a research period that enables the advertisements being served to be capable of having an impact on the user so that the user has the promotional information prior to making his/her purchase decision(s).

For example, using the example of Bob purchasing a car during the spring, it would not be beneficial for Bob to receive car advertisements in April (mid-Spring) or late in spring. It would be ideal for Bob to receive such promotions prior to his anticipated buying window; therefore, Bob can be served the advertisements prior to the Spring season beginning (or even early in the Spring Season)—for example, serving the advertisements to Bob in February as he prepares for his car purchase in Spring beginning on Mar. 20, 2015.

In another example, using Jane's yearly purchase of school supplies in August, it would be more beneficial for Jane to receive the promotions for school supplies prior to August; therefore, Jane may be in receipt of promotional materials in July.

According to some embodiments, the threshold for serving advertisements in advance of a predicted purchase can depend on the type of frequency calculation. For example, to be used as illustration purposes and not to be construed as limiting, if a user's purchases are determined to happen during a specific month, a threshold for serving the advertisement may be at least 2 weeks prior to the predicted event. Therefore, using the Jane example above, since Jane purchases school supplies in August, Jane may be in receipt of school supply advertisements as early as July $15^{th}$. In another non-limiting example, if a frequency determination is based on a season, then the threshold may dictate the promotional material be provided to the user in advance of the season starting. Therefore, as above in Bob's example, Bob purchases a car in the spring, therefore prior to Spring starting, Bob may receive ads as early as February but prior to spring starting on Mar. 20, 2015, as discussed above.

Furthermore, in some embodiments, the threshold for serving ads may be additionally or alternatively based on the type of purchase (referred to as a category above). For example, using the Bob and Jane examples above, more research is typically involved in purchasing a car than school supplies; therefore, depending on the type of purchase, certain ads (or types of ads) may be served earlier than other advertisements. For example, Bob would receive the ads for a car well in advance of when Jane would receive ads for her predicted school supply purchases, respectively.

According to some embodiments, the prediction modelling discussed herein is based on analyzing a user's message inbox and serving ads in connection with the user's inbox; however, it should be understood that the advertisements may also be served to the user outside of the user's inbox application window (or user interface), as advertisements can be served to the user on a landing page associated with a service provider's home page (e.g., Yahoo!® Home page), in a toolbar or pane associated with a browser displaying web content, or as other types of messages such as SMS, MMS or according to any other known or to be known messaging applications, and the like, as understood by those of skill in the art.

According to some embodiments, the prediction modelling of the disclosed systems and methods discussed herein can be per user or an aggregate of users. That is, as discussed above the analysis of a single user's purchase history revealed through mining of the user's purchase receipt messages in his/her inbox can indicate contextual and temporal activity that can be confidentially anticipated for serving advertisements to the user. In some embodiments, analysis of messages can be associated with an aggregate or plurality of users in order to determine anticipated purchase trends. For example, every November, a number of users (above a threshold) purchases ski equipment. Therefore, it can be predicted that next November advertisements associated with ski equipment will be contextually and temporally relevant to a plurality of users, not just those users that previously purchased ski equipment.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information. In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
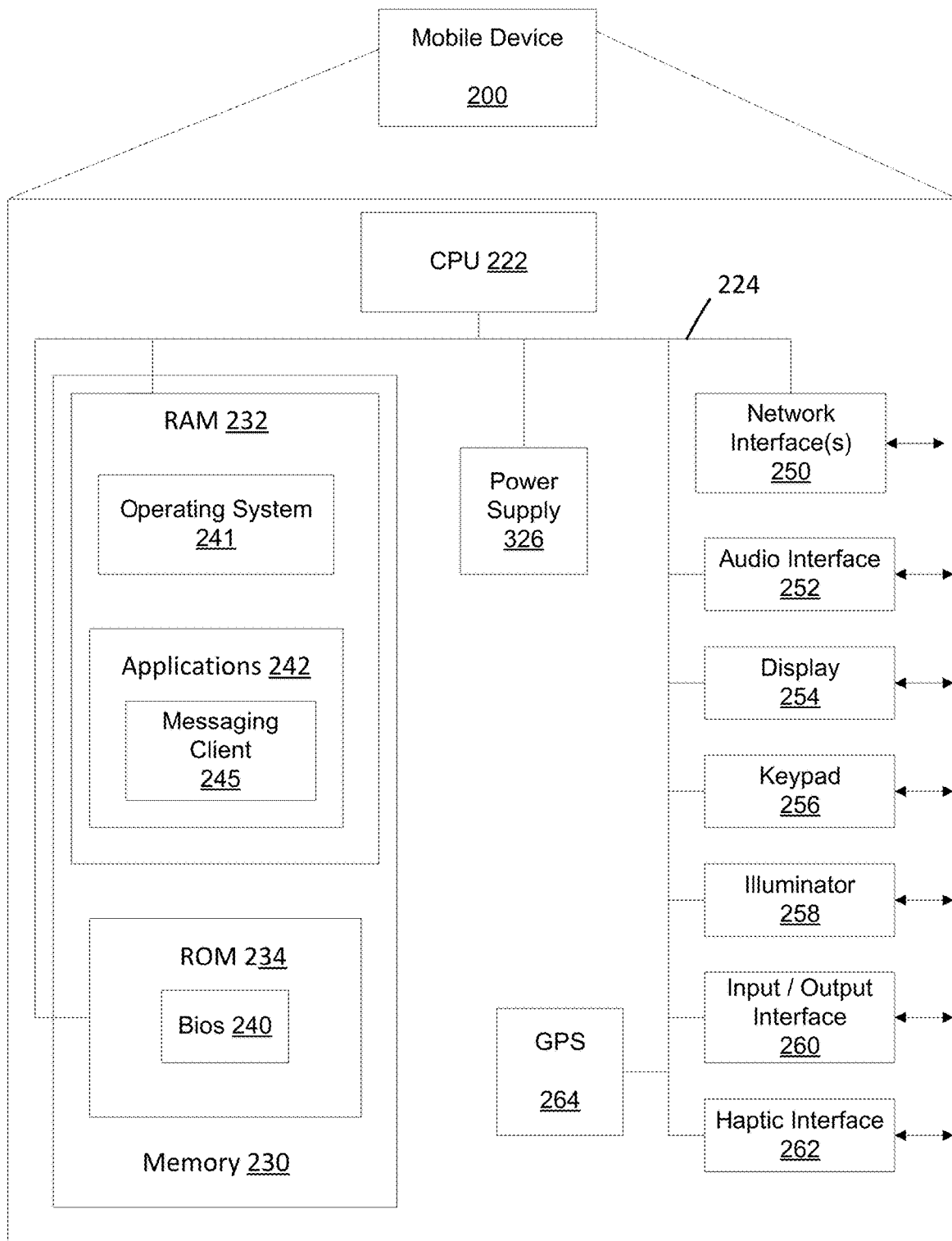
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
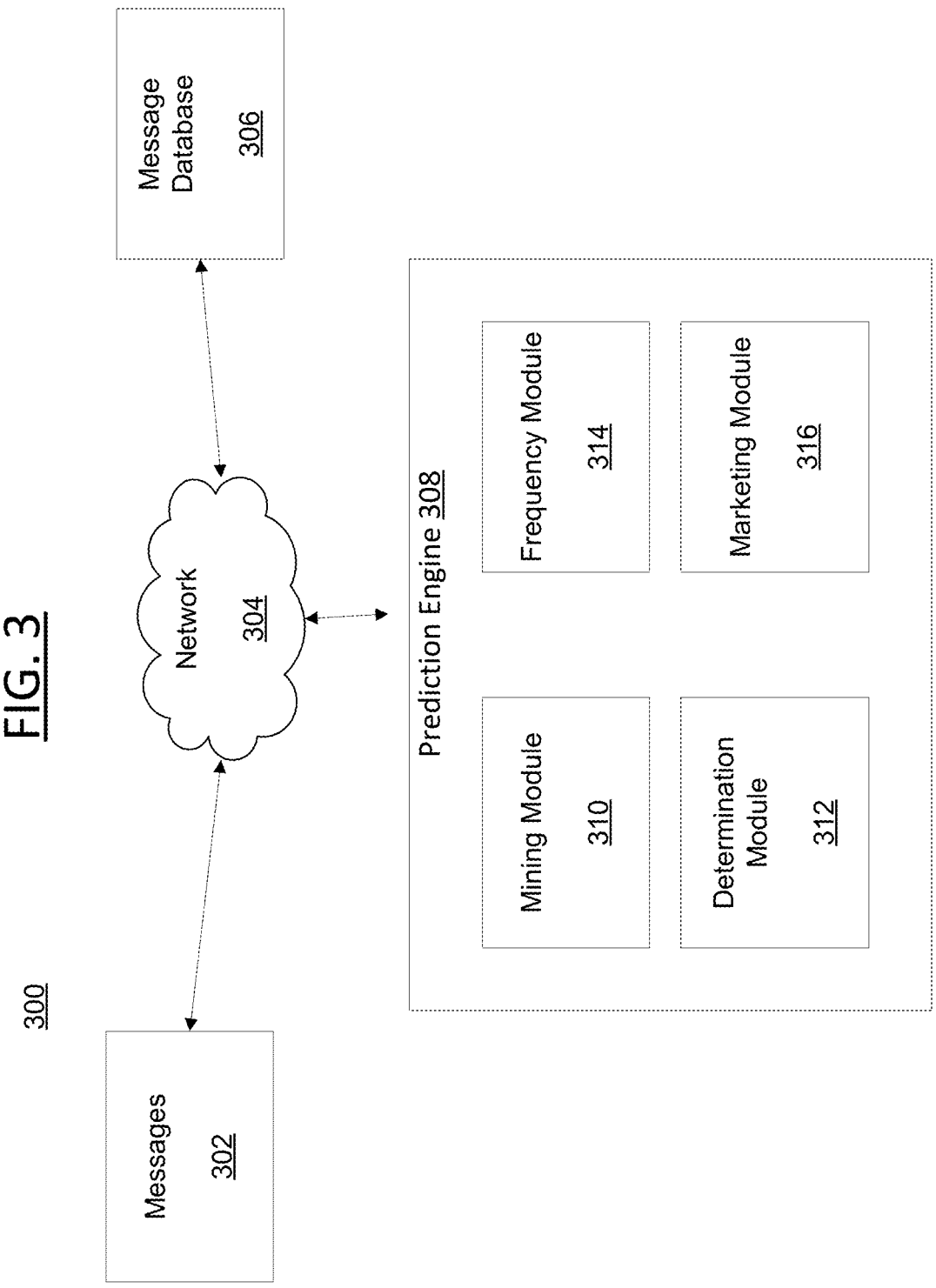
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a prediction engine 308 and a database 306 for storing messages. The prediction engine 308 could be hosted by a web server, content provider, email service provider, ad server, a user's computing device, or any combination thereof. The plurality of messages 302 can be any type of message. Examples of such messages 302 can include email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages 302 can be provided to the prediction engine 308 or accessed by a computer program or device that can access the messages. In some embodiments, the messages 302 can be stored in a database of stored messages 306, which is associated with an email provider, such as Yahoo! Mail®. The database 306 can be any type of database or memory that can store the messages 302 and associated message template information, as discussed above.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be communicated and/or accessed and processed by the prediction engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the prediction engine 308, and the database of stored resources 306.

The prediction engine 308 includes a mining module 310, determination module 312, frequency module 314 and marketing module 316. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4.

Figure 4:
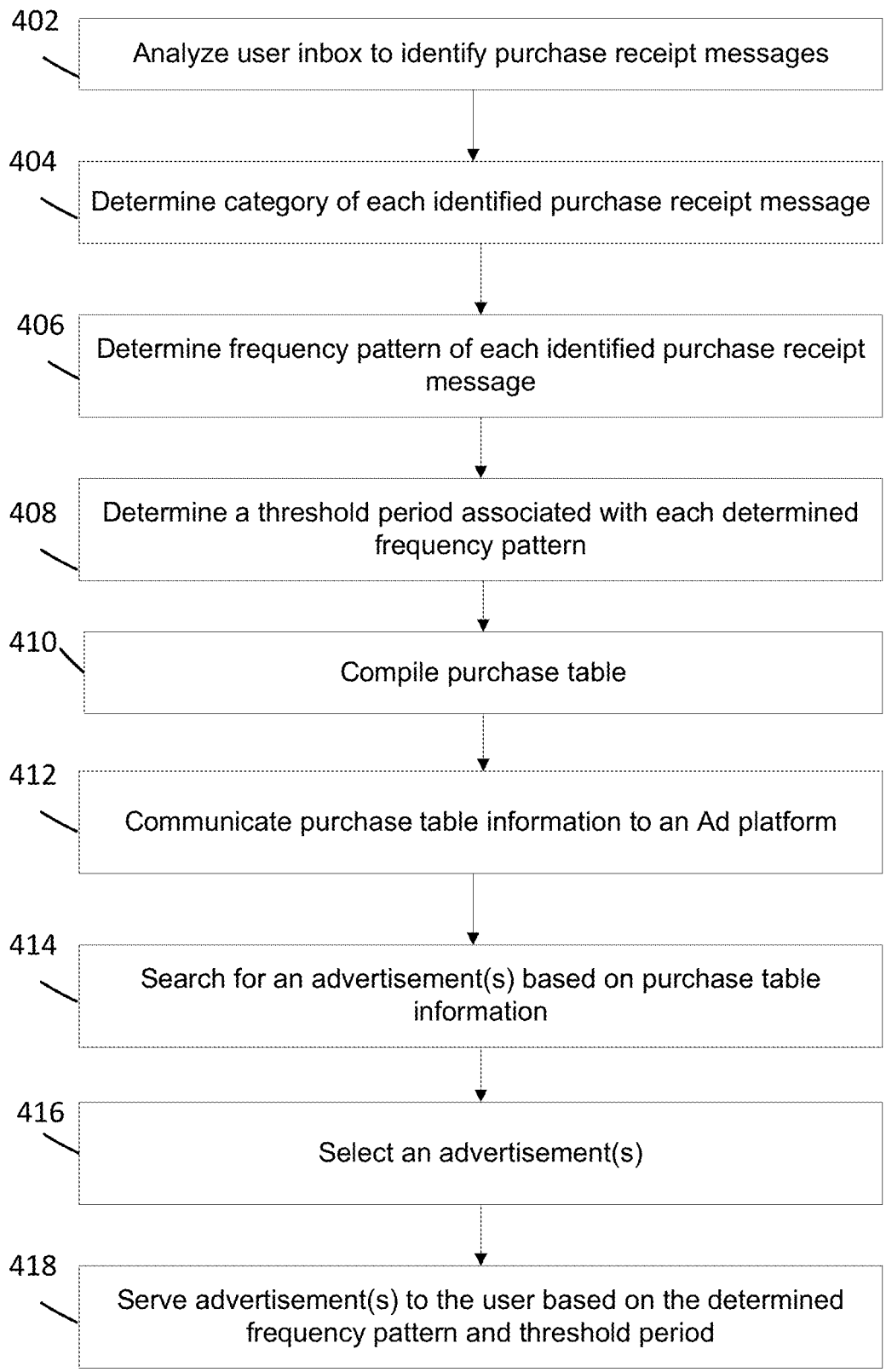
FIG. 4 is a flowchart illustrating steps performed in accordance with some embodiments of the present disclosure.

FIG. 4 is a process 400 diagram illustrating steps performed in accordance with embodiments of the present disclosure for predicting a user's future purchases based on a periodicity analysis of the user's purchase history from purchase receipt messages in the user's inbox. As mentioned above, purchase receipt messages are those messages that a user receives as receipt and/or confirmation of a purchase. For example, if a user purchases a replacement HEPA filter for a room air cleaner on Amazon®, the user will receive a purchase receipt message detailing the purchase. If that user typically changes the HEPA filter every three months, a periodic purchase history will develop, and this data can be mined, processed and used to identify a future time period, in the current example at or proximate three months from the date of the last detected HEPA filter purchase, to be used by the as system to serve a highly contextually relevant (related to HEPA filters) and temporally relevant (at or near the time of actual need) to the user.

Typically, such receipt message will include information related to, but not limited to, the vendor, the purchaser, the item purchased, the amount paid, and the purchase date, and the like. Therefore, as discussed in more detail below in relation to the steps of Process 400, the prediction engine 308 can mine a user's inbox for purchase receipt messages and parse those messages to identify the item purchased and the purchase date of the item. The prediction engine 308 can also determine the frequency of such purchases; that is, whether such purchases are reoccurring according to a determine frequency, or, in other words, that the purchases indicate a purchase pattern or interval associated with the user. Based on this determination, the prediction engine 308 can predict when like or similar purchases are to occur in the future, and based on this prediction, contextually and temporally relevant advertisements, coupons or promotions can then be served to the user in advance of the projected purchase(s).

In some embodiments, the disclosed systems and methods can be performed from (or within) a single message platform, e.g., Yahoo! Mail®; and in some embodiments, the across multiple platforms, such as Yahoo! Mail®, Google Mail®, Hotmail®, and other personal and business email platforms, such as Microsoft Outlook®, and the like. In some embodiments, at least some steps performed in Process 400 of FIG. 4 can be performed offline and/or online.

Process 400 begins with Step 402 where a user's inbox is mined to identify purchase receipt messages in the user's inbox. This step is performed by the mining module 310 of the prediction engine 308. The mining occurring in Step 402 involves analyzing the entire inbox of the user, including all sub-folders and categorized messages. According to some embodiments, the analysis involves parsing each message, including the subject line, sender identifier (from the "From:" section of the message) and body of the message, to identify whether there is identifying information in the message indicating that the message is a purchase receipt. As discussed above, a purchase receipt can include, but is not limited to, information related to, the vendor, the purchaser, the item purchased, the amount paid, and the purchase date. As such, the analysis occurring in Step 402 can involve identifying whether messages and/or associated message metadata indicate a purchased item, a purchase amount and/or a vendor identifier (in the message metadata, message body, subject line or in the sender identifier), or some combination thereof.

In Step 404, a determination is made regarding a category associated with the identified purchase receipt messages. This step is performed by the determination module 312. That is, for each purchase receipt message identified, a category of the item identified in the purchase receipt is determined. For example, a user has purchase receipts in his/her inbox associated with a car purchase, a silverware purchase and a cruise purchase (from Step 402). Based on the category determination occurring in Step 404, the car purchase can be determined to be associated with a "vehicle" category, the silverware purchase can be determined to be associated with a "kitchen" category, and the cruise purchase can be associated with a "vacation" category.

In Step 406 a determination is made regarding the frequency of each individual purchase receipt message. This step is performed by the frequency module 314. That is, for each purchase receipt message identified from Step 402, a determination is made as to how many times the same or a similar purchase has occurred and when such purchases have occurred. Thus, the frequency determination performed by the frequency module 314 involves updating a counter associated with each purchase receipt. The frequency module 314 also can implement any known or to be known machine learning, pattern recognition, behavioral recognition, data mining or knowledge discovery in databases (KDD) algorithms or techniques, such as, but not limited to, Sparse Factor Analysis (SFA), Hidden Markov Models (HMMs), Support Vector Machines (SVMs), Bayesian Methods, and the like, in order to determine a purchasing pattern (or habit) of the user associated with the purchased item. Such pattern recognition takes into account how often an item purchases an item (or like item as discussed below), and over which time period/interval(s) each purchase occurs. Based on the calculated number of purchases over a determined time span, a determination can be made regarding how frequently the user purchases such items.

For example, if a user purchases groceries every Sunday, then it can be determined that every 7 days, on a Sunday, the user will most likely purchase groceries. As discussed below in more detail, a threshold can be applied to ensure that a minimum confidence level is achieved in determining a user's frequency of particular purchases.

The frequency determination of Step 406 may only count a same or similar purchase receipt message if it appears in the user's inbox above a threshold, and in some embodiments, such threshold may be based on how often the purchases occur and which type of item (or category) has been purchased. For example, if a user has two purchase receipts for a winter jacket four years apart, this may not satisfy the threshold for winter jacket purchases (or winter clothes category), as this would most likely not evidence a purchasing pattern for the user. However, in another example, if another user has six winter jacket purchases, each occurring every year for the last six years, this would evidence a pattern that would satisfy a threshold.

In some embodiments, only the purchase receipts associated with the same purchase may be counted during the frequency determination. For example, if a user has three purchase receipt messages in his/her inbox for a bicycle, then the frequency determination of Step 406 identifies that the user has purchased three bicycles. In some embodiments, purchase receipts associated with similar items, such as those messages falling within a similar/same category can be counted during the frequency determination. For example, analysis of a user's inbox reveals that each of the last three summers the user has gone on a fishing vacation, a cruise and to Las Vegas. Each of these trips can fall within a "vacation" category, and while they are not all the same trip, a determination can be made that next summer the user will be going on another trip.

Therefore, the frequency determination of Step 406 results in determined or predicted future events (or occurrences) based on the frequency patterns for purchased items, as discussed above. The predicted future events (also referred to as future purchase event timing) indicate that a user will subsequently purchase another same or similar item in line with when the user's past purchases have occurred. In some embodiments, Steps 402-408 can be updated by continuously monitoring the user's inbox for incoming messages.

In Step 408 the frequency module 314 further determines a threshold period for when an advertisement should be served to the user based on each determined purchase pattern (or habit) of the user. That is, some purchases typically have a research period leading up to the purchase, whereas some purchases are spur of the moment (or do not require extensive research). For example, purchasing a vacation typically involves researching a trip at least 2-3 months in advance. However, purchasing a bicycle may only involve a week's research, for example. Therefore, as discussed above in Step 406, based on the item predicted to be purchased, or in some embodiments the category of item that is determined to be purchased, a threshold period can be attributed to each frequency determination which can be applied to each recognized purchase pattern and predicted event.

For example, a user has gone on vacation during August for the past 3 years. Since it is determined that the this is a vacation which typically involves at least 2-3 months of research in addition to the fact that a vacation must be purchased in advance of the actual trip, a threshold period can be applied to the determined purchase pattern resulting in the period of August being modified to May or June each year.

In some embodiments, determination of the threshold period for each item's determined purchase pattern can be based upon any known or to be known machine learning, pattern recognition, behavioral recognition, data mining or knowledge discovery in databases (KDD) algorithms or techniques, such as, but not limited to, Sparse Factor Analysis (SFA), Hidden Markov Models (HMMs), Support Vector Machines (SVMs), Bayesian Methods, and the like, in order to determine the ideal predicted purchase window associated with each item (or category).

Thus, according to some embodiments, the frequency module 312 can determine a "timer" based on the pattern determination in Step 406 and the determined threshold period in Step 408, whereby when the timer expires, or is set to expire, it is time to serve a contextually and temporally relevant ad to the user associated with the item or category associated with the predicted event.

Process 400 then turns to Steps 410-418 which are performed by the marketing module 316 of the prediction engine 308. In Step 410 a purchase table is compiled for each item, which can be saved in a database associated with the user's messaging account, on the user's device, on a web server, content server or ad server, or some combination thereof. For each determined purchase pattern (from Steps 406-408), a purchase table can be compiled, which can include information related to, but not limited to:

| Purchased Item | Vendor (e.g., Seller) | Purchase Amount | Category | Purchase Pattern |
|---|---|---|---|---|

As discussed above, the purchased item, vendor information and purchase amount are identified from Step 402; the category of the purchased item is determined in Step 404 and the purchase pattern is determined in Step 406 (and Step 408). Such information is collected and compiled in a purchase table. The collection and compilation can occur upon detection of purchased items, in real-time, as a batch determination, immediately prior to an ad search, upon executing an ad search, or some combination thereof.

As discussed above, each item identified from a purchase receipt in the user's inbox that appears above a threshold has a purchase table compiled for it. In some embodiments, items in a similar category may be grouped together in a single purchase table for such category.

While embodiments discussed below in relation to Steps 410-418 are disclosed to include an ad platform searching for advertisements, embodiments exist where the searching, selection and serving of advertisements can be effectuated by the messaging server from which the purchase information is derived, e.g., Yahoo!® Mail. That is, as discussed above in relation to FIG. 3, the prediction engine can be hosted by a web server, content provider, email service provider, ad server, a user's computing device, or any combination thereof. Indeed, in some embodiments, the messaging server can host the ad platform in order to serve ads related to the messaging server's services, or the ad server can be managed by a third party that receives the context and timing information and uses it as part of an ad campaign or ad auction.

In Step 412 the purchase table compiled in Step 410, is then communicated to an advertisement platform comprising an advertisement server 130 and an associated ad database. In some embodiments, the entire purchase table is communicated, and in some embodiments, only a portion of the purchase table is communicated to the ad platform. In embodiments where only a portion of the information in the purchase table is communicated to the ad platform, such information must include at least the item or category of the item. As discussed above, in some embodiments an ad platform can be searched by a messaging server based on the purchase information.

In Step 414, upon receipt of the purchase table information, the advertisement server 130 performs a search for a relevant advertisement within the associated ad database. In some embodiments, the search for an advertisement is based on the identified item, and in some embodiments, the search for the advertisement is based on the category of the item, in addition to or alternatively to solely the item. In some embodiments, in addition to the item and/or category being searched, additional search characteristics can also include the identity of the vendor (so as to find similar or the same products from the same vendor) and/or the purchase amount (so as to find similar or the same products within the same price range), or some combination thereof.

According to some embodiments, the search performed by the ad server is performed in accordance with the pattern information included in the purchase table. That is, in some embodiments, the search for the ad(s) is performed in accordance with the purchase pattern information in order to select and convey up-to-date and relevant advertisement information to the user.

In Step 416, an advertisement is selected (or retrieved) based on the results of Step 414. In some embodiments, the advertisement can be selected based upon the result of Step 414, and modified to conform to attributes of the page or inbox upon which the advertisement will be displayed, and/or to the device for which it will be displayed.

In Step 418 the selected advertisement is served to the user in accordance with the predicted event in Step 406 and the threshold period of Step 408, as discussed above. In some embodiments, as in Step 418, the selected advertisement is shared or communicated via the email platform. In some alternative embodiments, the selected advertisement is sent directly to each user's computing device. In some embodiments, the advertisement is displayed in conjunction with a message associated with a similar purchase appearing in the user's inbox. In some embodiments, the ad is only displayed to the user during when the predicted event is to occur which is associated with the item/category for which the ad was selected. In some embodiments, the advertisement can be served to the user on a landing page associated with a service provider's home page (e.g., Yahoo!® Home page), in a toolbar and the like, as discussed above.

According to some embodiments, the purchase table information compiled in Step 410 can be sold to third party advertisers. This information can enable the hosting provider from which the purchase history is derived, for example, Yahoo!®, to charge a higher premium for enabling third parties to serve ads on their system as the contextual relevance of a served ad is increased due to the additional temporal component associated with the recognized pattern. As discussed above, the combination of the prediction engine 308's contextual and temporal prediction modelling can effectuate higher click-through-rates (CTRs) and increased revenues, salience and relevance of served advertisements due to an increased confidence that the ads being served to users are not only contextually relevant to their desires, but also temporally relevant to their needs at that moment when the ads are served. This can thereby impact an advertiser's, whether a third party or hosting provider, CPM, CPC, or CPA, or under some other agreed upon billable event.

By way of another non-limiting example, illustrating the steps performed in Process 400, solely for illustration purposes and not to be construed as limiting, analysis of user Bob's inbox reveals that his family has gone on a cruise every five years and the research period leading up to those cruises was three months (from email subscription receipts for travel sites). Based on this analysis, Bob can be targeted with an advertisement for vacation cruises (from the same vendor or like vendors, or for cruises having a similar cost, as discussed above) on the next five year anniversary minus the research period (i.e., threshold period). That is, for example, if Bob went on the trip in April every five years, he can be served vacation ads in January during the year of the five year anniversary of those trips.

Figure 5:
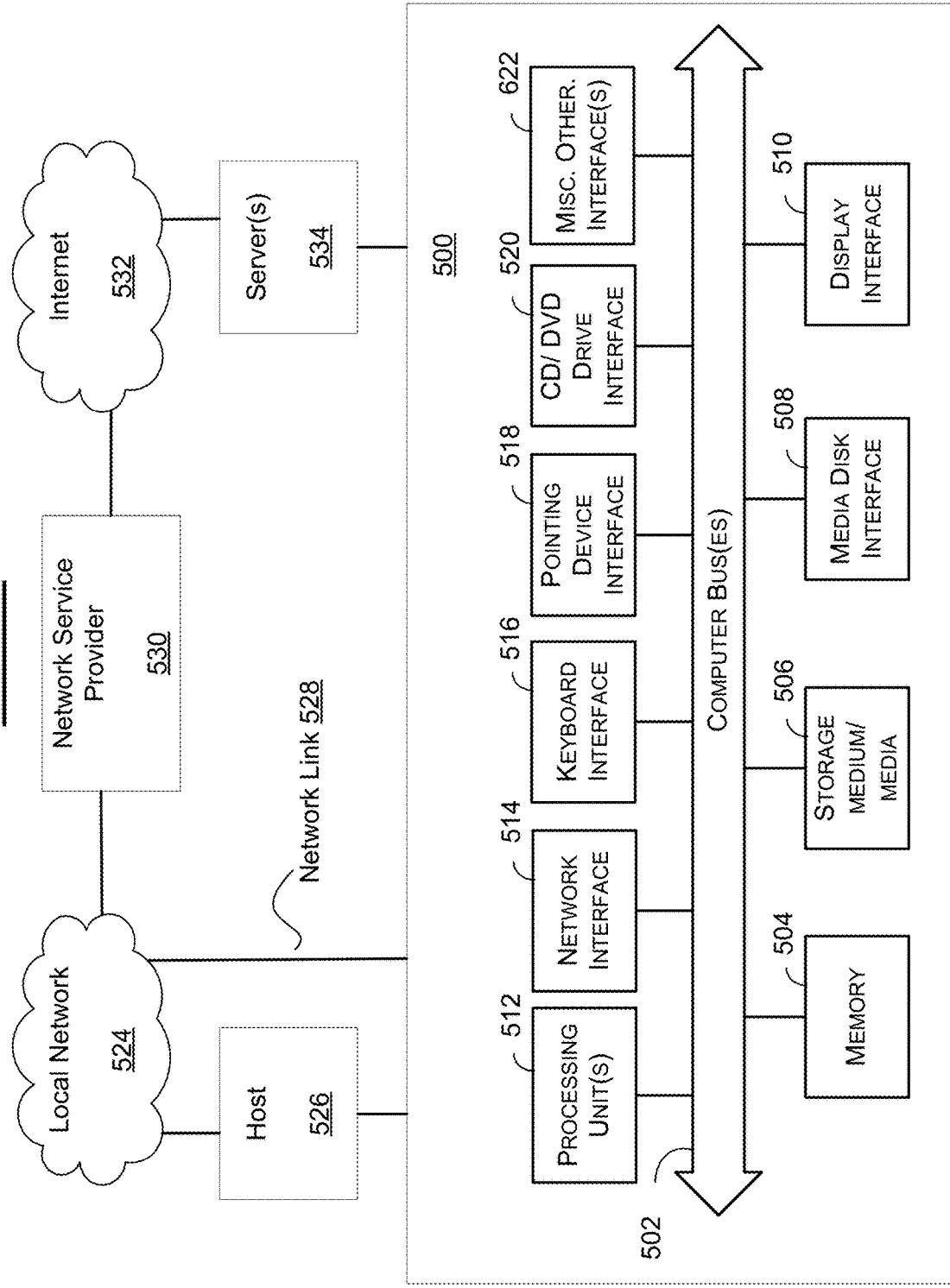
FIG. 5 is a block diagram illustrating architecture of a hardware device in accordance with one or more embodiments of the present disclosure.

As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 505, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein, e.g., one or more of process flows described herein. CPU 512 first loads computer executable process steps from storage, e.g., memory 504, computer readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
analyzing, via a computing device, messages comprised within an inbox of a user, said analysis comprising parsing metadata and data of each message with respect to data related to a purchased item;
identifying, via the computing device, based on said analysis, purchase receipt messages associated with the purchased item, said purchase receipt messages being messages within said inbox that comprise content related to said purchased item;
analyzing, via the computing device using pattern recognition software, the purchase receipt messages;
determining, via the computing device, based on said pattern recognition analysis, a count of each purchase receipt message and an interval between each purchase receipt message;
determining, via the computing device, based on said count and interval determination, a user frequency associated with said purchase receipt messages;
determining, via the computing device, a category of said purchased item, said category encompassing a range of items associated with said purchased item;
determining, via the computing device, a purchase pattern for the purchased item based on the determined category and the user frequency, said purchase pattern indicating a future forecasted time said user will purchase said item again;
determining, via the computing device, that said future forecasted time is proximate to a current time;
communicating, via the computing device, over a network, a message to a third party platform based on said determination that said future forecasted time is proximate to said current time, said message comprising a search query including information indicating said determined category, said message further comprising instructions to execute said search query in association with said determined purchase pattern;
receiving, at the computing device, after execution and completion of the search query in accordance with said determined purchase pattern, third party content, said third party content having a context corresponding to said range of items;
modifying, via the computing device, the third party content based on attributes of the inbox of the user, the attributes corresponding to a specific display area within the inbox upon which the third party content will be displayed; and
communicating, via the computing device, at said current time proximate to the future forecasted time, said modified third party content to said inbox, the communication causing the specific display area of the inbox to be modified for a time period proximate to the future forecasted time such that the modified third party content is displayed within the specific display area of the inbox during the time period, and after conclusion of the time period, the specific display area of the inbox is modified again to remove display of the modified third party content and revert to its original display characteristics.

2. The method of claim 1, further comprising:
determining a threshold period associated with said purchase pattern based on the determined category of the purchased item, said threshold period indicating a time period prior to said future purchase event timing, wherein said future purchase event timing is based on said threshold period.

3. The method of claim 1, wherein said potential purchase information further comprises information indicating said determined category.

4. The method of claim 1, wherein said potential purchase pattern is determined when said count satisfies a threshold.

5. The method of claim 1, wherein said potential purchase information further comprises information associated with an amount paid for the purchased item and vendor information from which the purchased item was purchased.

6. The method of claim 1, wherein said purchase receipt messages are identified when a number of said messages satisfies a threshold.

7. A non-transitory computer-readable storage medium tangibly encoded with computer-executable instructions, that when executed by a processor associated with a computing device, performs a method comprising:
analyzing messages comprised within an inbox of a user, said analysis comprising parsing metadata and data of each message with respect to data related to a purchased item;
identifying, based on said analysis, purchase receipt messages associated with the purchase item, said purchase receipt messages being messages within said inbox that comprise content related to said purchased item;

analyzing, using pattern recognition software, the purchase receipt messages;

determining based on said pattern recognition analysis, a count of each purchase receipt message and an interval between each purchase receipt message;

determining, based on said count and interval determination, a user frequency associated with said purchase receipt messages;

determining a category of said purchased item, said category encompassing a range of items associated with said purchased item;

determining a purchase pattern for the purchased item based on the determined category and the user frequency, said purchase pattern indicating a future forecasted time said user will purchase said item again;

determining that said future forecasted time is proximate to a current time;

communicating, over a network, a message to a third party platform based on said determination that said future forecasted time is proximate to said current time, said message comprising a search query including information indicating said determined category, said message further comprising instructions to execute said search query in association with said determined purchase pattern;

receiving, after execution and completion of the search query in accordance with said determined purchase pattern, third party content, said third party content having a context corresponding to said range of items;

modifying the third party content based on attributes of the inbox of the user, the attributes corresponding to a specific display area within the inbox upon which the third party content will be displayed; and communicating, at said current time proximate to the future forecasted time, said modified third party content to said inbox, the communication causing the specific display area of the inbox to be modified for a time period proximate to the future forecasted time such that the modified third party content is displayed within the specific display area of the inbox during the time period, and after conclusion of the time period, the specific display area of the inbox is modified again to remove display of the modified third party content and revert to its original display characteristics.

8. The non-transitory computer-readable storage medium of claim 7, further comprising:

determining a threshold period associated with said purchase pattern based on the determined category of the purchased item, said threshold period indicating a time period prior to said future purchase event timing, wherein said future purchase event timing is based on said threshold period.

9. The non-transitory computer-readable storage medium of claim 7, wherein said potential purchase information further comprises information indicating said determined category.

10. The non-transitory computer-readable storage medium of claim 7, wherein said potential purchase pattern is determined when said count satisfies a threshold.

11. The non-transitory computer-readable storage medium of claim 7, wherein said potential purchase information further comprises information associated with an amount paid for the purchased item and vendor information from which the purchased item was purchased.

12. The non-transitory computer-readable storage medium of claim 7, wherein said purchase receipt messages are identified when a number of said messages satisfies a threshold.

13. A computing device comprising:

a processor; and a non-transitory computer-readable storage medium for tangibly storing thereon program logic for execution by the processor, the program logic comprising:

logic executed by the processor for analyzing messages comprised within an inbox of a user, said analysis comprising parsing metadata and data of each message with respect to data related to a purchased item;

logic executed by the processor for identifying, based on said analysis, purchase receipt messages associated with the purchase item, said purchase receipt messages being messages within said inbox that comprise content related to said purchased item;

logic executed by the processor for analyzing, using pattern recognition software, the purchase receipt messages;

logic executed by the processor for determining based on said pattern recognition analysis, a count of each purchase receipt message and an interval between each purchase receipt message;

logic executed by the processor for determining, based on said count and interval determination, a user frequency associated with said purchase receipt messages;

logic executed by the processor for determining a category of said purchased item, said category encompassing a range of items associated with said purchased item;

logic executed by the processor for determining a purchase pattern for the purchased item based on the determined category and the user frequency, said purchase pattern indicating a future forecasted time said user will purchase said item again;

logic executed by the processor for determining that said future forecasted time is proximate to a current time logic executed by the processor for communicating, over a network, a message to a third party platform based on said determination that said future forecasted time is proximate to said current time, said message comprising a search query including information indicating said determined category, said message further comprising instructions to execute said search query in association with said determined purchase pattern;

logic executed by the processor for receiving, after execution and completion of the search query in accordance with said determined purchase pattern, third party content, said third party content having a context corresponding to said range of items;

logic executed by the processor for modifying the third party content based on attributes of the inbox of the user, the attributes corresponding to a specific display area within the inbox upon which the third party content will be displayed; and logic executed by the processor for communicating, at said current time proximate to the future forecasted time, said modified third party content to said inbox, the communication causing the specific display area of the inbox to be modified for a time period proximate to the future forecasted time such that the modified third party content is displayed within the specific display area of the inbox during the time period, and after conclusion of the time period, the specific display area of the inbox is modified again to remove display of the modified third party content and revert to its original display characteristics.

14. The computing device of claim 13, further comprising:

logic executed by the processor for determining a threshold period associated with said purchase pattern based on the determined category of the purchased item, said threshold period indicating a time period prior to said future purchase event timing, wherein said future purchase event timing is based on said threshold period.

* * * * *